June 30, 1931.  T. DUGAN  1,812,143
AIRPLANE
Filed March 22, 1930
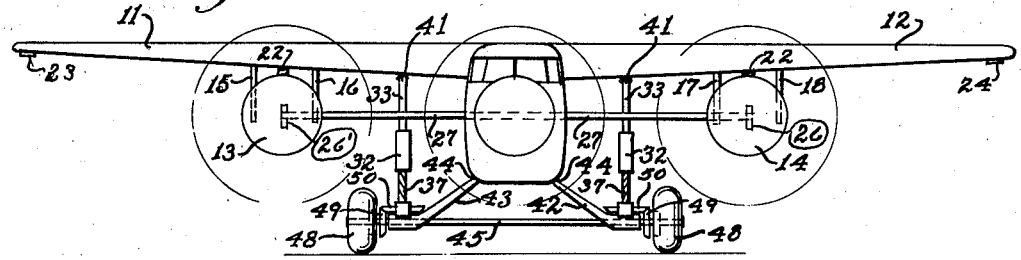
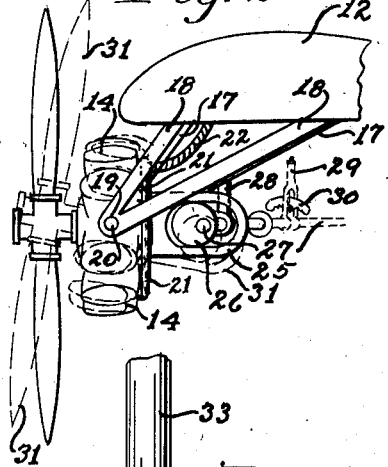
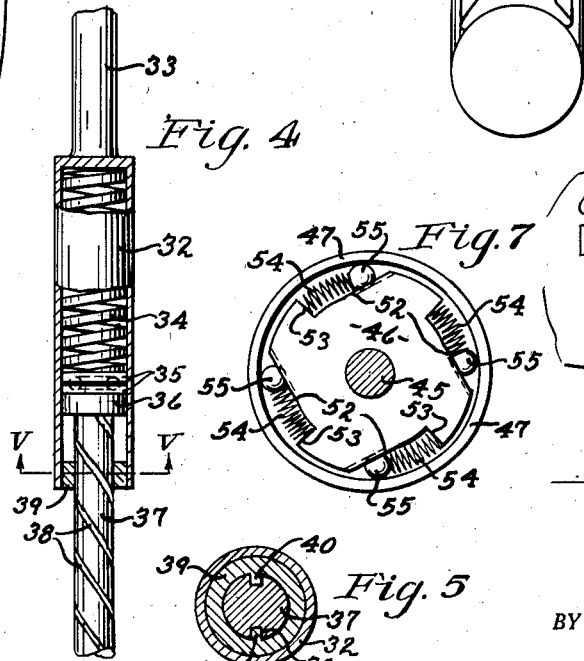
INVENTOR.
Thomas Dugan
BY
M. Y. Charles
ATTORNEY.

Patented June 30, 1931

1,812,143

UNITED STATES PATENT OFFICE

THOMAS DUGAN, OF WICHITA, KANSAS, ASSIGNOR OF ONE-HALF TO ROBERT B. DAVIS, OF WICHITA, KANSAS

AIRPLANE

Application filed March 22, 1930. Serial No. 438,023.

This invention relates to an improvement in airplanes. The object of this invention is to provide a means of getting the airplane off the ground in a shorter distance than has been possible heretofore. Another object is to provide an airplane which can be easily brought out of a tail spin or a nose dive by applying power in a diverted line to the travel of the airplane when it is in the tail spin or nose dive. These and other objects will be more fully described as this description progresses.

Referring to the drawings, Fig. 1 is a front view of my improved airplane. Fig. 2 is a side view of the motor mountings. Fig. 3 is a side view of a portion of the airplane showing the location of the shock absorber and wheel turning mechanism. Fig. 4 is a sectional detail view of the shock absorber and wheel drive shaft mechanism. Fig. 5 is a sectional view taken along the line V—V in Fig. 4. Fig. 6 is a detail of the drive shaft and gearing employed in the drive of the wheels. Fig. 7 is a detail of the clutch mechanism in the wheels of the airplane.

In the drawings is shown an airplane body 10 having the wings 11 and 12 on which are mounted motors 13 and 14. At 15, 16 and 17, 18 are shown motor supports mounted on the wings 11 and 12 as shown. The lower ends of these supports are journals 19 to receive shafts 20 which are the supports for the motor 13 or 14. At 21 is shown the exhaust pipe of the motor to which is connected a flexible exhaust tube 22 which discharges into the metal wings 11 or 12 of the airplane, and this functions as a muffler for the motor and at the same time provides a means of heating the wing as will later be described. At 23 and 24 are shown pressure relief valves in the wings of the airplane, the object of which will be later explained. On the rear of the engines 13 and 14 is a rearwardly projecting yoke 25 in which is mounted an eccentric 26. The eccentric 26 is rigidly attached to the shaft 27 which connects to another eccentric 26' and duplicate mechanism of that shown in Fig. 2 on the opposite side of the airplane. At 28 is shown a bearing arm for the shaft 27, said bearing arm 28 being supported on the brackets 16 or 17. On the shaft 27 is rigidly mounted a lever 29 which is located in the cabin where the pilot, while driving the airplane can easily adjust the lever. At 30 is shown a notched segment such as is ordinarily used to lock levers in any desired position, however any suitable mechanism may be used for this purpose. Now by turning the shaft 27 by means of the lever 29, the cam 26 is turned to an up or down position which in turn tilts the motors 13 and 14 downward or upward as shown by the dotted position 31, the object of tilting the motors is as follows: If the motor is tilted upward it will tend to lift the airplane and get it off the ground in less time than has heretofore been possible. Another object is that if the airplane is in the air, and should go into a nose dive or tail spin, the motors can be tilted either up or down and be used to pull the airplane out of the nose dive or tail spin, as the case may be. In Fig. 4 is shown a shock absorber having a housing 32 on a shaft 33. Within the housing is a spring 34, one end of which is seated in the upper end of the housing 32 and the other end bearing on a thrust bearing 35 which rests on a head 36, on a shaft 37, the shaft 37 is provided with spiral grooves 38. At 39 is shown a sleeve like member rigidly set in the lower end of the housing 32, the member 39 is provided with tooth like elements 40 adapted to enter the spiral grooves 38 as a means of turning the shaft 37 when the said shaft is slipped in or out of the housing 32. The upper end of the shaft 33 is hingedly attached to the airplane wings 11 and 12 as indicated at 41. At 42 and 43 are shown arm like members hinged at 44 to the airplane body 10 and on the lower ends of said arms 42 and 43 are supported on an axle 45, the outer ends of said axle being rigidly attached to a clutch member 46, adapted to engage with the drum 47, in the wheels 48. Integral with the member 46 is a bevel gear 49 in mesh with the bevel gear 50 which is rigidly affixed to the shaft 37, which is seated in a bearing 51 on the axle 45.

In Fig. 7 is shown a clutch mechanism consisting of the plate 46, having sloping portions 52, and projecting portions 53 against which rests a spring 54, the opposite end of said spring exerting its pressure against a ball 55 which functions as a wedge between the drum 47 and the member 46 so that by rotating the member 46 in an anticlockwise direction, the balls 55 will wedge between the members 46 and 47 and turn the member 47 with the member 46 which in turn revolves the wheel 48 in which the drum 47 is located. However if the wheel is rolled in an anticlockwise direction, the drum may turn, (such as it would be in landing) around the member 46 without being interfered with by the wedging of the balls 55.

In taking off the ground my invention functions as follows: The motors are tilted in an upward position 31 and when the motors are speeded up they lift the airplane up as well as pull it forward. When the airplane is lifted as just described the spring 34 presses the shaft 37 downward, causing the shaft to rotate due to the members 40 playing in the groove 38. By reason of the rotation of the shaft 37 the gear wheel 50 is rotated and gear wheel 50 being in mesh with the gear wheel 49 the said gear wheel 49 is also rotated in a forward direction with respect to the forward travel of the airplane. When the member 46 is rotated as above described, the balls 55 wedge between the face 52 of the member 46 and the drum 47 and act as a clutch and turn the wheels 48. This aids in a quick gain of speed of the airplane so that the airplane may be lifted from the ground in a shorter distance than heretofore, which is one of the objects of this invention.

When the airplane lands, the springs 34 act as a shock absorber and the shaft 37 is pushed into the housing 32 which causes the shaft to rotate as heretofore described, except that the shaft turns in the opposite direction which results in the member 46 being rotated in a clockwise direction while the wheels 48 roll on the ground and roll in an anticlockwise direction, and during this action the balls push back against the springs 54 and do not bind to clutch the drum 47 and turn it with the member 46.

The flexible exhaust pipe 22 being connected to the hollow metal wings 11 and 12 accomplishes two things; first, the exhaust being discharged into the wing causes the wing to function as a muffler for the engine; second, the exhaust from the motor being discharged into the wings provides a means of warming the wings so that ice or sleet can not collect and stay on the wing during cold weather. The exhaust is discharged through the pressure relief valves 23 and 24 for the final exhaust. It will be understood that in the case of large airplanes sometimes a portion of the passenger cabin is included between the wings of the palne. In this case a portion of the walls of the cabin will contact the hot gases exhausted into the wings of the airplane and function as a heating means for the cabin in cold weather. The object of these valves 23 and 24 is that a slight pressure may be built up in the wing from the exhaust of the motors so as to provide an even distribution of heat in the wing during cold weather.

It will be understood that such modifications may be employed as lie within the scope of the appended claims without departing from the spirit or intention of my invention.

Now, having fully described my invention, what I claim as new and desire to secure by Letters Patent is:

1. In an airplane, a landing gear hinged to the body of the airplane, a shock absorber positioned between the landing gear axle and the body of the airplane, a shaft as a part of the shock absorber and adapted to telescope in an upper part of the shock absorber, spiral grooves in said shaft and thread like lugs on the upper part of said shock absorber as a means of rotating the shaft, a gear wheel on the lower end of said shaft, a ground wheel and a clutch therein and a gear wheel on said clutch, said gear wheel being in mesh with the gear wheel on said shaft, as a connecting means for the delivery of power for rotating the ground wheel substantially as shown and described.

2. In an airplane, a landing gear hinged to the body of the airplane, a shock absorbing device positioned between the landing gear axle and the body of the airplane, a shaft as a part of the shock absorber, said shaft being adapted to telescope in an upper part of the shock absorber, a compression spring, said spring being positioned between the upper end of said shaft and the upper part of the shock absorber, spiral grooves in said shaft and thread like lugs on the upper part of said shock absorber, said threadlike lugs engaging the spiral groove in said shaft as a means of rotating the shaft, a gear on the lower end of said shaft, a ground wheel and a clutch therein and a gear wheel on said clutch, said gear wheel being in mesh with the gear wheel on said shaft as a connecting means for the delivery of power for rotating the ground wheel as and for the purpose specified.

In testimony whereof he affixes his signature.

THOMAS DUGAN.